No. 613,789. Patented Nov. 8, 1898.
C. ARMSTRONG & F. J. KNIGHTS.
CORKING MACHINE.
(Application filed Jan. 3, 1898.)

(No Model.) 6 Sheets—Sheet I.

Witnesses
A. M. Parkins.
E. A. Ballock

Inventors
Charles Armstrong &
Frederic James Knights,
by their Attorneys,
Baldwin, Davidson & Wight No. 613,789. Patented Nov. 8, 1898.
C. ARMSTRONG & F. J. KNIGHTS.
CORKING MACHINE.
(Application filed Jan. 3, 1898.)

(No Model.)  6 Sheets—Sheet 2.

No. 613,789. Patented Nov. 8, 1898.
C. ARMSTRONG & F. J. KNIGHTS.
CORKING MACHINE.
(Application filed Jan. 3, 1898.)

(No Model.) 6 Sheets—Sheet 3.

Witnesses
Inventors
Charles Armstrong &
Frederic James Knights,
By their Attorneys,
Baldwin, Davidson & Wight

THE NORRIS PETERS CO., PHOTO-LITHO., WASHINGTON, D. C.

No. 613,789. Patented Nov. 8, 1898.
C. ARMSTRONG & F. J. KNIGHTS.
CORKING MACHINE.
(Application filed Jan. 3, 1898.)
(No Model.) 6 Sheets—Sheet 4.

Witnesses
A. M. Parkins.
E. A. Balloch.

Inventors
Charles Armstrong &
Frederic James Knights,
by their Attorneys
Baldwin Davidson & Wight.

No. 613,789. Patented Nov. 8, 1898.
C. ARMSTRONG & F. J. KNIGHTS.
CORKING MACHINE.
(Application filed Jan. 3, 1898.)

(No Model.) 6 Sheets—Sheet 5.

Witnesses
A. M. Parkins.
E. A. Balloch.

Inventors
Charles Armstrong &
Frederic James Knights,
by their Attorneys
Baldwin, Davidson & Wight

UNITED STATES PATENT OFFICE.

CHARLES ARMSTRONG, OF CAMBRIDGE, AND FREDERIC JAMES KNIGHTS, OF LONDON, ENGLAND.

CORKING-MACHINE.

SPECIFICATION forming part of Letters Patent No. 613,789, dated November 8, 1898.

Application filed January 3, 1898. Serial No. 665,377. (No model.)

*To all whom it may concern:*

Be it known that we, CHARLES ARMSTRONG, merchant, residing at Grange road, Cambridge, in the county of Cambridge, and FREDERIC JAMES KNIGHTS, engineer, residing at 27 Portland road, South Tottenham, London, in the county of Middlesex, England, subjects of the Queen of Great Britain, have invented a certain new and useful Corking-Machine, of which the following is a specification.

The object of our invention is to cork bottles expeditiously by improved mechanism.

Our improved machine has a stationary table along which an endless conveyer travels with an intermittent motion. The conveyer consists of two endless chains, to which are attached slats with V-shaped indentations, according to the number of bottles the machine is designed to cork at one time. The mechanism for compressing the corks and the plungers for pushing the corks into the bottles are carried on bars, which can be adjusted to take bottles of various heights. Beneath the bars are a series of bottle-stands, which slide in and out of a box beneath the table and hold the bottle up to the corking-nozzle. The bottle-stands are normally flush with the table, and their periphery or sides extend downward. Thus broken glass or corks are prevented from interfering with their movements.

The details of construction are hereinafter described.

Figure 1:
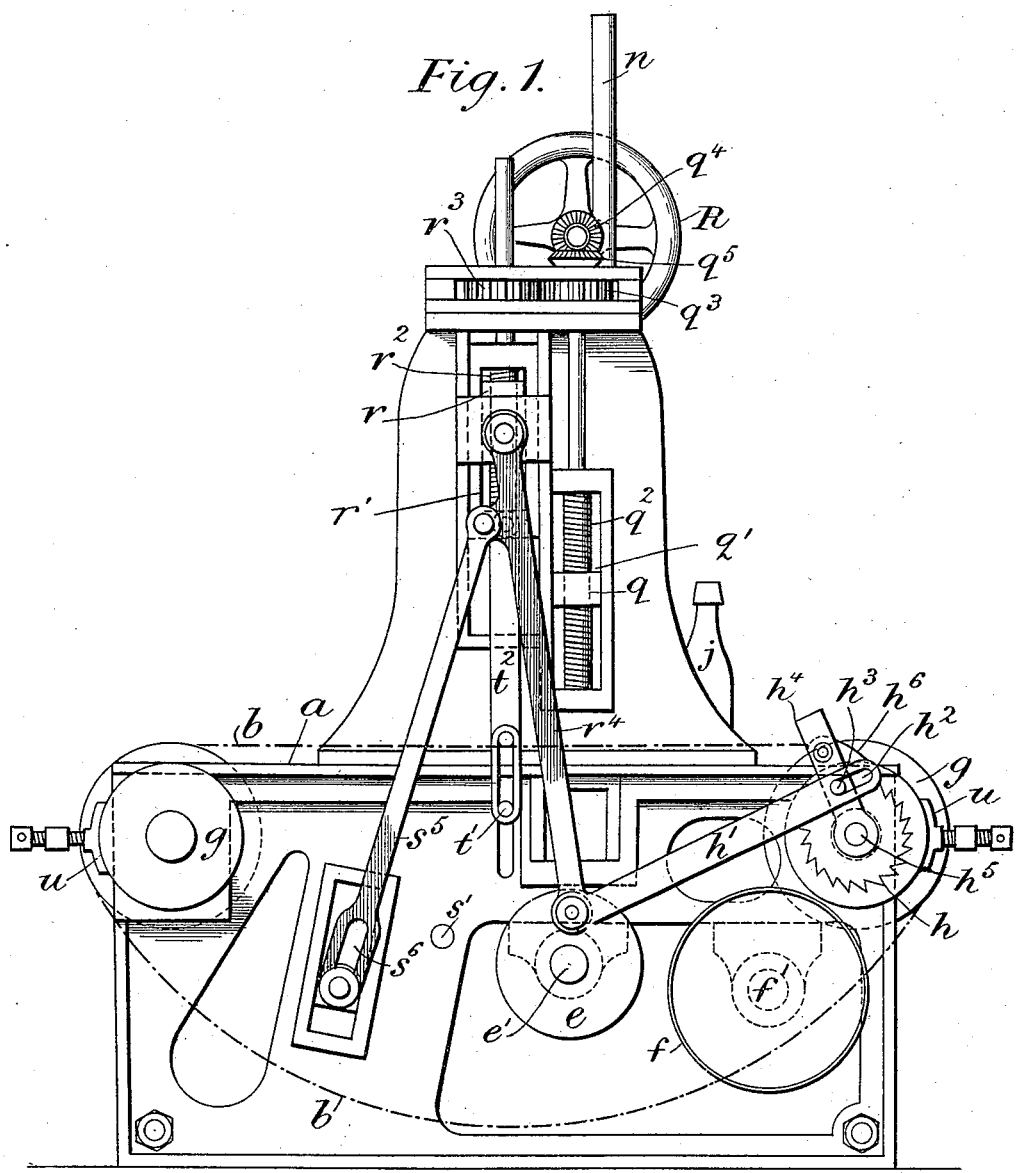
Figure 2:
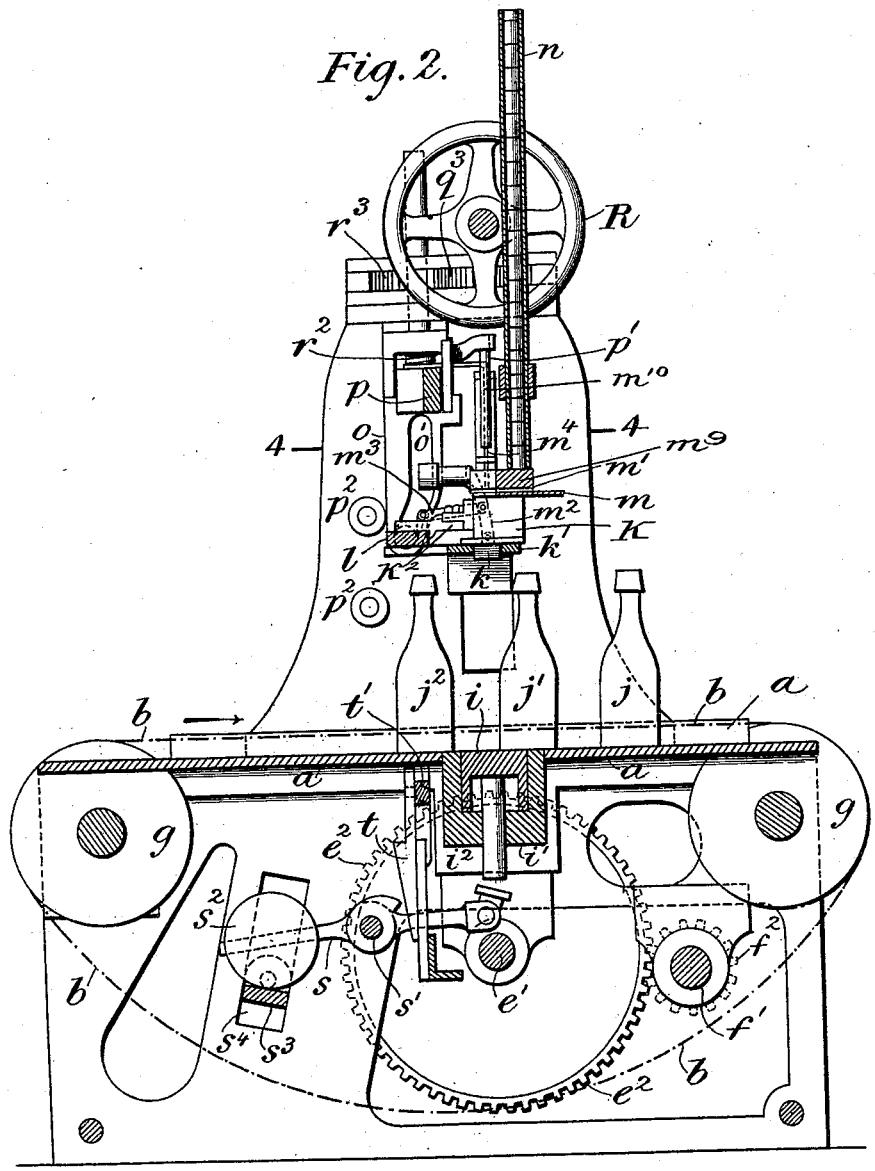
Figure 3:
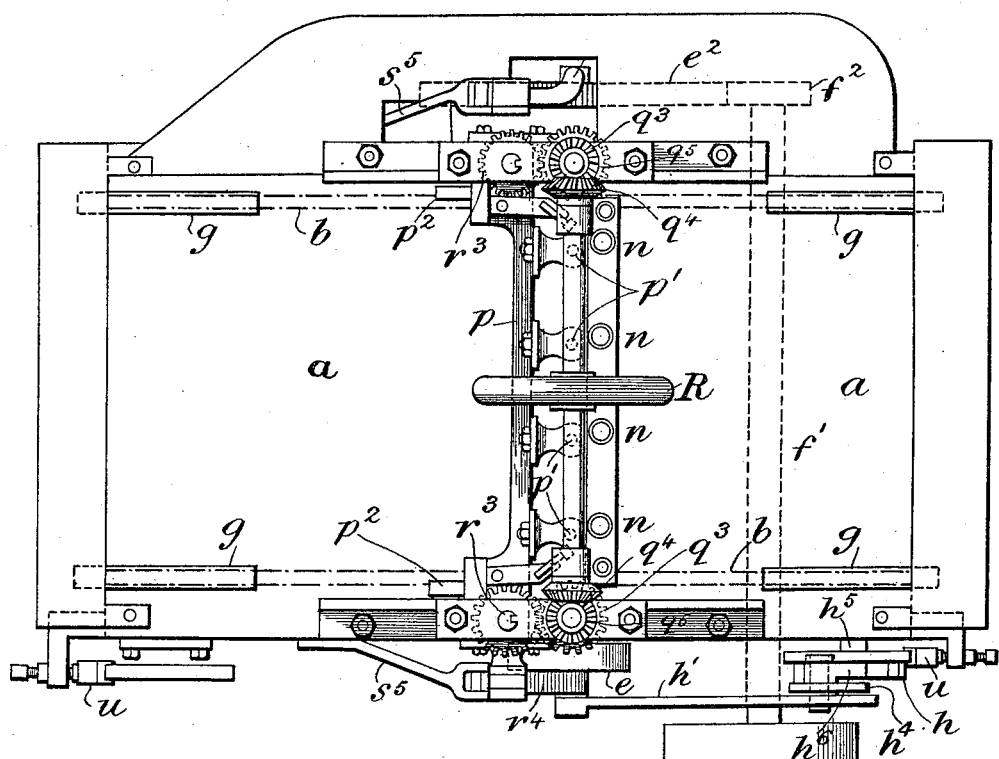
Figure 7:
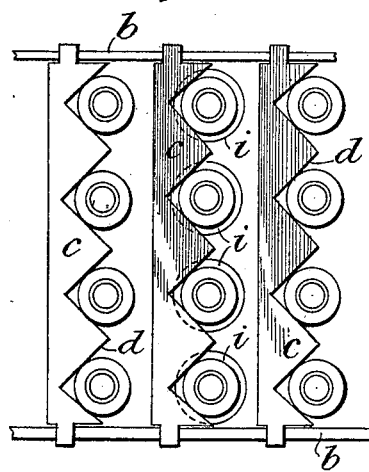
Figure 4:
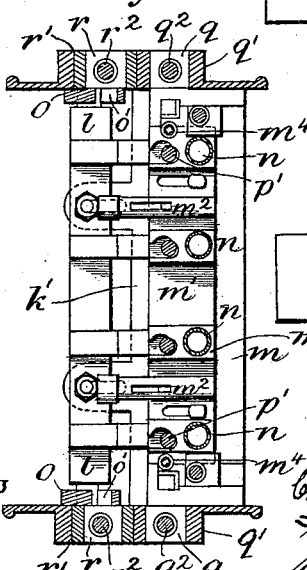
Figure 6:
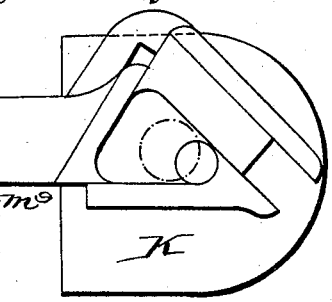
Figure 5:
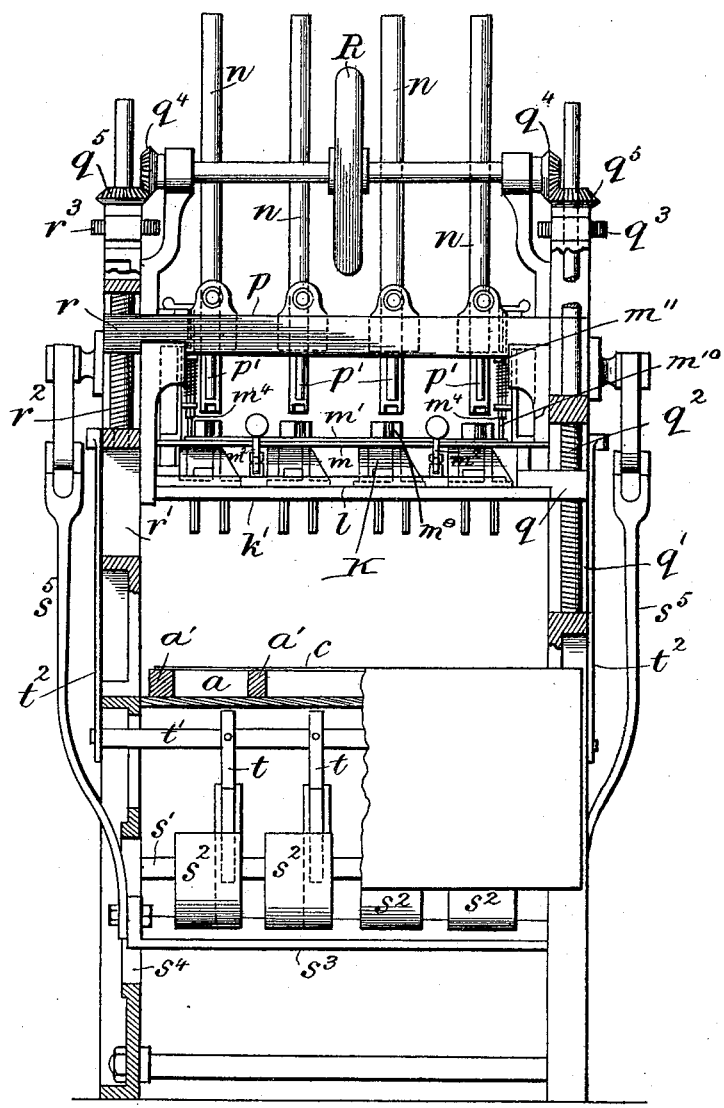
Figure 9:
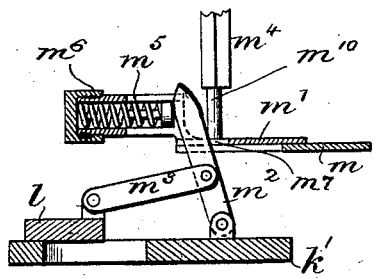
Figure 8:
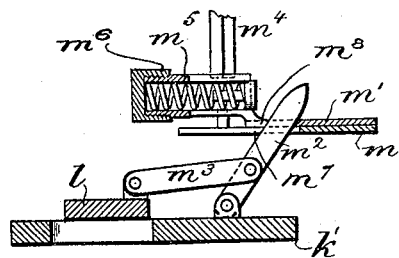
Figure 11:
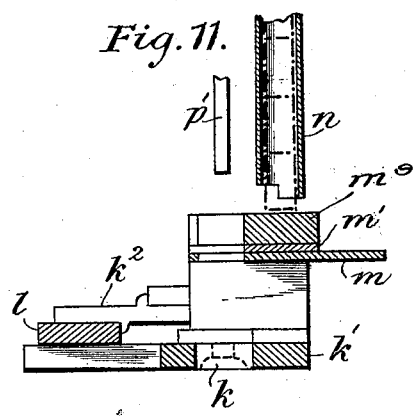
Figure 10:
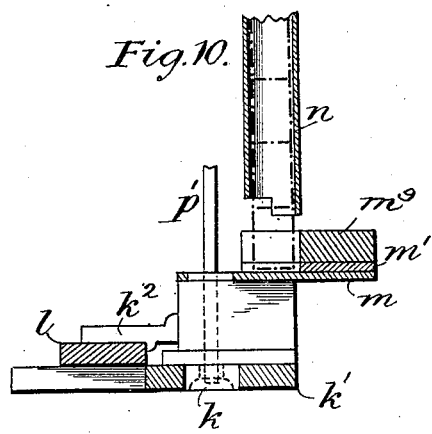

In the accompanying drawings, Figure 1 is a side elevation of the machine. Fig. 2 is a longitudinal section. Fig. 3 is a plan with the conveyers removed. Fig. 4 is a section on the line 4 4, Fig. 2; and Fig. 5 is a front elevation, partly in section. Fig. 6 is a plan view showing one of the cork-compressors on a larger scale. Fig. 7 is a plan view showing a portion of the conveyer and the bottle-stands. Figs. 8 and 9 are detail views in section showing, on a larger scale, part of the mechanism for delivering the corks. In Fig. 8 the upper plate is shown in its rearmost position, and Fig. 9 shows the position of the upper plate after the springs have pulled it forward. Figs. 10 and 11 are detail views in section of the mechanism shown in Figs. 8 and 9, with some other parts added thereto.

Figure 12:
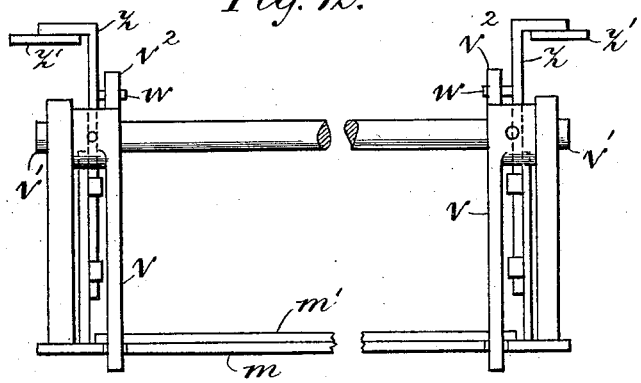
Figure 13:
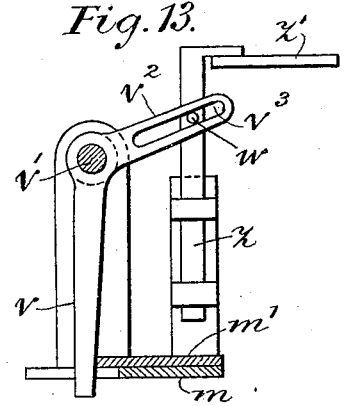
Figure 14:
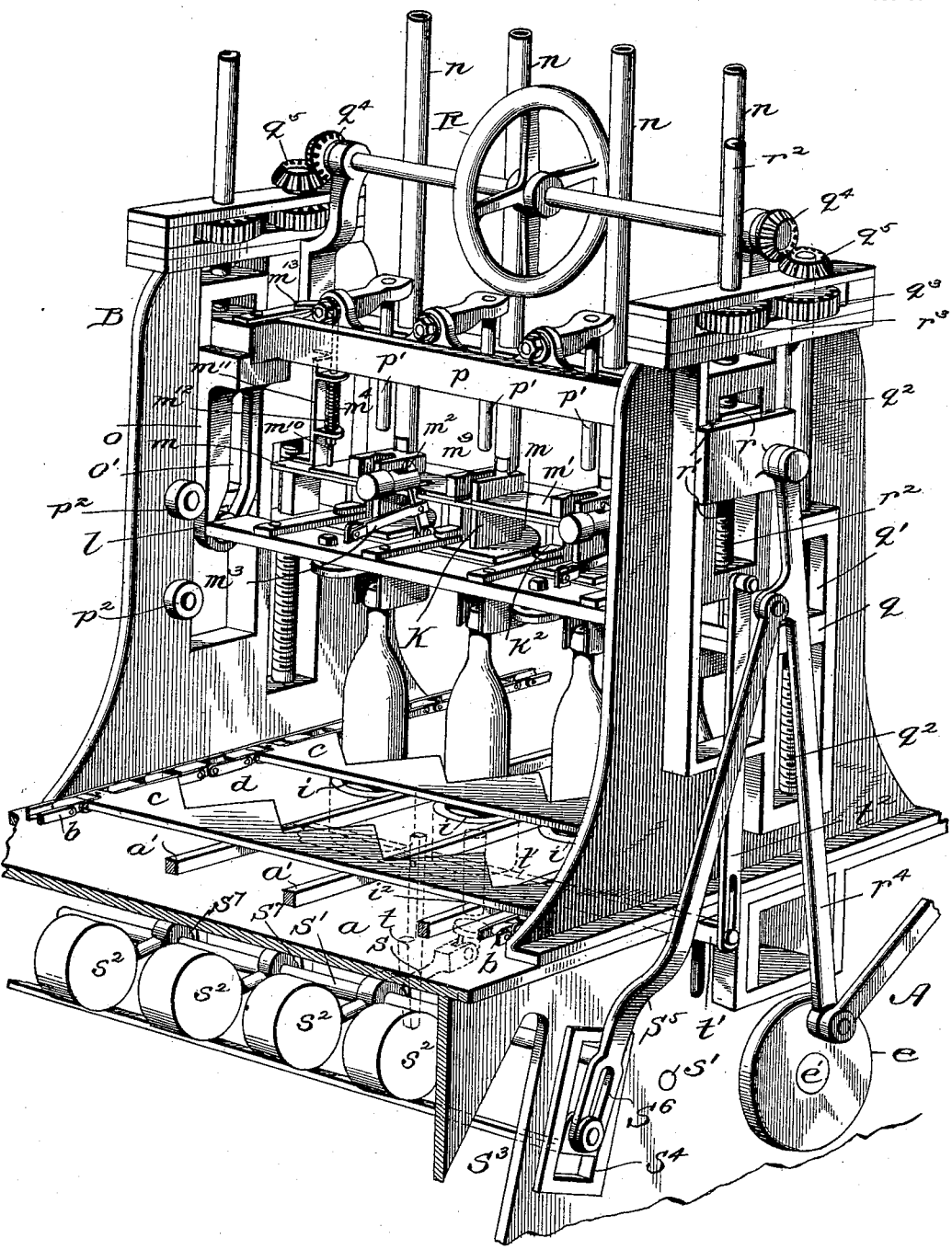

Fig. 12 is a rear elevation, and Fig. 13 is a section, of a modification of part of the mechanism. Fig. 14 is a perspective view of the machine with part of the driving and feed mechanism removed.

The main frame A may be of any suitable construction to sustain the parts attached thereto. A stationary table $a$ is secured to the frame A, and along this table travels a conveyer, consisting of two endless chains $b$ and a series of slats $c$, with V-shaped indentations $d$, facing the line of travel. On the table $a$ are secured a series of rails $a'$, on which the slats slide. The indentations $d$ are of sufficient size to embrace the bottles to a sufficient extent to prevent them from moving sidewise, so that the conveyer moves the bottles forward in straight lines below the corking mechanism and over the bottle-stands. The chains $b$ pass over chain-wheels $g$, to one of which is fixed a toothed wheel $h$.

The apparatus receives all its movements from the disk $e$, keyed to the shaft $e'$, which is continuously revolved by the belt-pulley $f$ on the shaft $f'$ by means of pinions $e^2$ and $f^2$ on the shafts $e'$ and $f'$.

The wheel $h'$ receives an intermittent motion by means of the connecting-rod $h'$, pivoted at one end to the wheel $e$ and having a slot $h^2$ at the other to receive the pin $h^3$. This pin is fixed to the lever $h^4$, turning on the shaft $h^5$ and carrying a pawl $h^6$, which engages with the teeth of the wheel $h$.

The bottles are placed on the table $a$ by hand. The conveyer takes them along the table, and at the same time the V-shaped indentations guide them over the bottle-stands $i$, as shown in Fig. 7.

Referring to Fig. 2, the bottle $j$ has been corked and has been moved from the stand. The bottle $j'$ has been corked and is moving from the stand, and the bottle $j^2$ is moving onto the stand.

The bottle-stands $i$ are cylindrical blocks which are moved upward in a box $i'$ by means of levers S, pivoted to a horizontal shaft S'. The levers S engage at their inner ends with the stems $i^2$, projecting downwardly from the stands $i$ through the bottom of the box $i'$. When the stems $i^2$ are not supported by the levers S, the bottle-stands are depressed or in their lowermost position, as shown in Fig. 2, their upper ends being flush with the table $a$. The stands descend by their own weight from their elevated position when the supporting-levers S are dropped.

The levers S have attached to their ends weights $S^2$, which can be raised by the bar $S^3$, which is reciprocated upwardly in an inclined direction in the guides $S^4$ by one of the rods $S^5$, which has a slot $S^6$ at one end and at its opposite end is attached to the rod $r^4$, which latter rod is reciprocated in the manner hereinafter described. By this means any height of bottle can be corked at the same time. The weights at the ends of the levers force the bottles into the corking-nozzles, and when in position the levers are locked by wedges $t$, attached to the bar $t'$, which is moved in a vertical direction by the rod $t^2$, connected to the block fixed to the bar $p$, which latter is reciprocated in the manner hereinafter described. The levers S have nibs $S^7$, by which they can be locked by the wedges $t$.

$k$ are the corking-nozzles, carried by a horizontal bar $k'$, which extends horizontally across the machine above the table between the uprights B. The bar $k'$ also carries the cork-compressors, one of which is shown in Fig. 6. This, however, is of usual construction and forms no part of the present invention. The cork-compressors are illustrated in Fig. 14 at K. They are operated by projections $k^2$, secured to a horizontal bar $l$, which extends across the machine between the uprights B.

Above the cork-compressors is a horizontal plate $m$, which extends transversely across the machine, and upon this plate slides another plate $m'$, which controls the delivery of corks from the vertical tubes $n$. The plate $m$ is stationary and serves mainly to support the sliding plate $m'$, which latter is reciprocated by means of levers $m^2$, which are pivotally connected to the stationary plate $k'$ and are also connected by means of links $m^3$ to the horizontal sliding bar $l$. The plate $m'$ carries tubular housings $m^6$, within which are arranged springs $m^5$. When the parts are in the position shown in Fig. 8, the springs $m^5$ are uncompressed and the levers $m^2$ are not in contact with the springs. When the parts are in the position shown in Fig. 9, the springs $m^5$ are under compression, the levers $m^2$ being in contact with the springs.

$m^4$ are bolts which are operated to at times hold the plate $m'$ in the position shown in Fig. 8, and they are operated at the proper time to release the plate $m'$ and permit it to move backwardly to the position shown in Fig. 9. The arrangement is such that when the plate $m'$ is held by the bolts $m^4$ in the position shown in Fig. 8 the levers $m^2$ can move backwardly or to the left as viewed in the drawings, Figs. 8 and 9, and put the springs $m^5$ under compression; but as soon as the bolts $m^4$ are raised out of the way of the plate $m'$ the springs $m^5$, acting on the stationary levers $m^2$, will cause the plate $m'$ to slide rapidly backward or to the left as shown in Fig. 9.

The levers $m^2$, which are secured to the stationary bar $k'$, extend through slots $m^7$ in the plate $m$ and also into slots or notches $m^8$ in the plate $m'$. The plate $m'$ is provided with a series of blocks $m^9$, which are recessed to receive the corks from the tubes $n$.

The bar $l$ is reciprocated backward and forward by the groove $o'$ in the cam-plate O, which is attached to a vertically-reciprocating bar $p$, which carries the plungers $p'$. The bar $p$ is operated from the disk $e$ by means of the connecting-rod $r^4$. The rollers $p^2$ take the thrust of the cam-plates O. The bars $k'$ and $p$ can be adjusted for different heights of bottles by the mechanism clearly shown in Figs. 1, 5, and 14. The bar $k'$, to which are attached the compressors and the cork-operating mechanism, is connected to nuts $q$, sliding in guides $q'$ and which can be raised and lowered by the screws $q^2$. The bar $p$ is connected to nuts $r$, sliding in guides $r'$ and which can be raised or lowered by the screws $r^2$.

At the top of the stem of each screw $q^2$ is a toothed pinion $q^3$, gearing with another pinion $r^3$ on a screw-rod $r^2$. The stem of the screw $r^2$ has a feather working in a slot in the pinion $r^8$, so that it turns with the pinion, but is free to reciprocate up and down with the bar $p$. These screws are operated by the hand-wheel R through the toothed pinions $q^4$ $q^5$, which turn the pinions $q^3$. Thus the bars $k'$ and $p$ can be raised and lowered with reference to the table $a$ without interfering in any way with the reciprocating movement of the bar $p$.

The bolts $m^4$ are clearly shown in Fig. 14. They consist of rods $m^{10}$, which are guided vertically in brackets $m^{11}$. Between the brackets are interposed spiral springs $m^{12}$, which are arranged to shoot the bolts downwardly. The upper ends of the rods are provided with arms $m^{13}$, which extend over the bar $p$. When the bar $p$ is raised, the plates are raised with it. The plates are moved downwardly by means of the springs $m^{12}$. Brakes $u$ are provided to insure the positive drive of the machine.

The operation of the apparatus is as follows: In the position shown in Fig. 2 of the drawings the bottle $j^2$ is just moving onto the stand $i$ and the bar $S^3$ is in position to allow the weights $S^2$ to fall. At this time the bar $p$ is moving down with the plungers $p'$ and the bar $l$ is moving horizontally to the right, compressing the corks in the cork-compressors K by means of the arms $k^2$, and the plate $m'$ is being moved to the right. This movement of the plate $m'$ allows the corks at the bottom of the tubes $n$ to fall onto the plate $m$. Fig. 11 shows the plate $m'$ under the tubes $n$, the blocks $m^9$ being arranged to support the corks. Fig. 10 shows the plate $m'$ moved to the right, and, as there shown, the bottom cork rests on the plate $m$ and is contained within the recesses of the blocks $m^9$. The plate $m'$ is retained for a short time in its rearward position by the bolts $m^4$, which are moved downwardly as the bar $p$ descends. By the time that the bottle $j^2$ is moved onto the stand $i$ the ends of the levers S act on the stems $i^2$ to raise the bottles up to the corking-nozzles, and as soon as they are thus raised the wedges $t$ engage the nibs $S^7$ and hold the bottle-stands in their elevated positions. The bar $p$ continues its descent and the plungers $p'$ push the corks into the bottles. The bar $p$ then begins to rise, taking the plungers $p'$ with it, and the cam-groove $o$ causes the plate $l$ to move backwardly to the left, and thus reopens the compressors, and at the same time the bar $t'$ is raised and the levers S are thereby unlocked. At the end of the upward movement of the bar $p$ the bolts $m^4$ are freed or withdrawn from their position in front of the plate $m'$, and this plate $m'$ is drawn quickly forward by the springs $m^5$. This movement of the bar $m'$ pushes the corks which are on the plate $m^{10}$, which are illustrated in Fig. 10, into the compressors ready to be inserted in the bottles by the next descent of the bar $p$. At this time the bottle $j^2$ will be in the position in which $j'$ is shown in Fig. 2 of the drawings.

The mechanism is so timed that the bottles are brought forward step by step and ranged up to the corking-nozzles at the proper time to receive the corks as they are pushed downward by the plungers, and new corks are fed to the corking mechanism at the proper time to be inserted in new bottles when they are in proper position and when the inserting mechanism descends.

In the modification shown in Figs. 12 and 13 the springs $m^5$ are omitted and the plate $m'$ is pushed forward by the arm $v$ of the bell-crank lever, pivoted at $v'$ to a standard on the bar $m$. In the other arm $v^2$ is a slot $v^3$, which engages with a pin $w$ on the arm $z$. The arm $z$ is raised by the projection $z'$ on the bar $p$. As the bar $p$ moves upwardly the arm $z$ is raised and motion is given to the bell-crank lever by the pin $w$ and the plate $m'$ is slidden on the plate $m$.

We claim as our invention—

1. The combination of a fixed table on which the bottles slide, endless chains above the table, slats with V-shaped indentations facing the line of travel secured to the chains, means for giving the chains an intermittent motion, and means for corking the bottles.

2. The combination of a fixed table on which the bottles slide, bottle-stands normally flush with the table and fitting holes therein, means for raising and lowering the bottle-stands, a conveyer for carrying bottles to the stands, and means for corking the bottles.

3. The combination of a fixed table on which the bottles slide, a box beneath the table, bottle-stands normally flush with the table and fitting holes therein and extending into the box, means for raising and lowering the bottle-stands, a conveyer carrying bottles to the stands, and means for corking the bottles.

4. The combination of a fixed table on which the bottles slide, endless chains above the table, slats with V-shaped indentations facing the line of travel and secured to the chains, means for raising and lowering the bottle-stands and means for corking the bottles.

5. The combination of a fixed table on which the bottles slide, cork-tubes above the table, a fixed plate arranged a short distance below the mouth of the tubes, a reciprocating plate moving upon the fixed plate across the lower ends of the tubes onto which the corks are delivered, reciprocating plungers at the side of the cork-tubes, and a conveyer carrying bottles beneath the plungers.

6. The combination of a fixed table on which the bottles slide, a conveyer above the table, cork-reservoirs, means for moving the corks from the reservoirs into position to be inserted in the bottles, corking mechanism, and means for raising and lowering the corking mechanism to insert the corks.

7. The combination of a fixed table, endless chains above the table, slats with V-shaped indentations fixed to the chains, means for giving the chains an intermittent motion, holes in the table, bottle-stands fitting the holes, means for raising and lowering the bottle-stands, a bar, cork-compressors carried by the bar, a second bar, plungers carried by it, means for causing the plunger-bar to reciprocate up and down and the compressor-bar to and fro.

8. The combination of a table, an endless conveyer for carrying bottles across the table, bottle-stands for raising the bottles from the table, means above the table for inserting the corks, a power-shaft, means operated by the power-shaft for moving the conveyer forward step by step, means operated by the same power-shaft for raising and lowering the bottle-stands, and means operated by said power-shaft for inserting the corks.

9. An automatic machine for corking bottles, comprising a table over which the bottles are moved, an endless conveyer for moving the bottles over the table, a power-shaft, connections between the power-shaft and the conveyer for moving it forward step by step, corking mechanism above the table and means operated by said power-shaft for inserting the corks.

10. The combination of a fixed table, a conveyer for moving bottles across the table, a series of bottle-stands, a series of weighted levers mounted to move independently and to operate independently on the bottle-stands, means for holding the levers in position to hold the bottle-stands in their elevated position, and means for simultaneously withdrawing the levers from the bottle-stands to permit them to descend.

11. An automatic machine for corking bottles, comprising a table over which the bottles move, a conveyer for moving the bottles across the table, a series of bottle-stands, a series of weighted levers engaging the bottle-stands, means for locking the levers to hold the bottle-stands in their elevated positions, means for simultaneously withdrawing the levers from the bottle-stands to permit them to descend, means for inserting the corks, and a power-shaft for giving motion to the conveying mechanism, the bottle-stand-operating mechanism and the mechanism for inserting the corks.

12. The combination of a fixed table, a conveyer above the table, bottle-stands, means for inserting the corks, means for raising and lowering the bottle-stands, and means for raising and lowering the mechanism for inserting the corks.

13. The combination of a fixed table, a conveyer for moving bottles across the table, a bar carrying corking-nozzles arranged above the table, means for raising and lowering said bar to adjust the position of the corking-nozzles for different sizes of bottles, cork-compressors, a horizontal bar by which they are carried, means for raising and lowering this bar to adjust it for different sizes of bottles, cork-delivery tubes and means operated by said last-mentioned bar for moving corks from the tubes into position over the corking-nozzles.

14. The combination of a table on which the bottles are supported, means for conveying bottles across the table, cork-delivery tubes, a fixed plate below the delivery-tubes, another plate sliding thereon, a horizontal bar mounted to reciprocate horizontally, levers $m^2$ projecting through slots in the sliding plate, connections between the levers and the horizontally-sliding bar whereby the sliding plate is moved away from the cork-delivery tube, means for moving the plate in the opposite direction, and means for inserting the corks.

CHARLES ARMSTRONG.
FREDERIC JAMES KNIGHTS.

Witnesses:
FRED C. HARRIS,
GEO. M. BUCKLEN.